United States Patent [19]

Ancel et al.

[11] Patent Number: 4,549,594

[45] Date of Patent: Oct. 29, 1985

[54] COMPOSITIONS HAVING A BASE OF SULFUR-VULCANIZABLE RUBBER

[75] Inventors: Christian Ancel, Monton; Pierre Philibert, Mirefleurs, both of France

[73] Assignee: Compagnie Generale des Etablissements Michelin, Clermont-Ferrand, France

[21] Appl. No.: 601,501

[22] Filed: Apr. 18, 1984

Related U.S. Application Data

[63] Continuation of Ser. No. 355,885, Mar. 8, 1982, abandoned.

[30] Foreign Application Priority Data

Mar. 16, 1981 [FR] France .................. 81 05367

[51] Int. Cl.$^4$ .......................... B60C 1/00; B32B 15/06
[52] U.S. Cl. ............................. 152/359; 156/124; 156/910; 428/295; 428/462; 428/465; 524/357
[58] Field of Search ............... 156/110.1, 124, 331.3; 152/330 R, 356 R, 359; 428/460, 461–463, 465, 295; 524/357

[56] References Cited

U.S. PATENT DOCUMENTS

| | | | |
|---|---|---|---|
| Re. 29,699 | 7/1978 | Kelly et al. | 428/414 |
| 2,912,355 | 11/1959 | Formanek et al. | 156/910 |
| 3,903,332 | 9/1975 | Kelly et al. | 427/207 |
| 3,905,947 | 9/1975 | Cowell et al. | 428/461 |
| 3,950,313 | 4/1976 | Bain et al. | 260/79.5 C |
| 3,991,130 | 11/1976 | Cowell et al. | 428/461 |
| 4,057,529 | 11/1977 | Leo et al. | 156/910 |
| 4,203,874 | 5/1980 | Halass et al. | 525/349 |
| 4,244,842 | 1/1981 | Batzer et al. | 525/370 |

FOREIGN PATENT DOCUMENTS

| | | |
|---|---|---|
| 0003820 | 9/1979 | European Pat. Off. . |
| 0009000 | 3/1980 | European Pat. Off. . |
| 2159315 | 6/1973 | France . |
| 2198830 | 4/1974 | France . |
| 2311797 | 12/1976 | France . |
| 2368515 | 5/1978 | France . |
| 122255 | 9/1976 | German Democratic Rep. . |
| 49-20072 | 5/1974 | Japan . |
| 1122528 | 8/1978 | United Kingdom . |

OTHER PUBLICATIONS

Chemical Abstracts, vol. 91, No. 12, Sep. 1979, p. 59, Abstract No. 92782m.

Primary Examiner—Lois E. Boland
Attorney, Agent, or Firm—Brumbaugh, Graves, Donohue & Raymond

[57] ABSTRACT

A composition comprising at least one sulfur-vulcanizable rubber, this composition being intended to adhere to at least one metallic surface during the course of vulcanization, is characterized by the fact that it further comprises from 0.1 to 2 parts by weight of nickel, present in the form of nickel (II) acetylacetonate, per 100 parts by weight of rubber.

12 Claims, No Drawings

COMPOSITIONS HAVING A BASE OF SULFUR-VULCANIZABLE RUBBER

This application is a continuation of application Ser. No. 355,885, filed on Mar. 8, 1982, now abandoned.

The present invention relates to compositions having a base of sulfur-vulcanizable rubber. More particularly, the invention concerns compositions of this type which are capable of adhering to metallic surfaces during the course of vulcanization.

It is known to use cobalt salts of organic acids or complex compounds of cobalt in order to improve the adherence of sulfur-vulcanizable rubber to metallic surfaces. Organic compounds of other metals have also been proposed, such as organic compounds of nickel, titanium and molybdenum. Compositions containing such organometallic compounds are described in particular in the following patents or patent applications: French Pat. Nos. 2 198 830, 2 311 797, 2 368 515, British Pat. No. 1 122 528, U.S. Pat. Nos. 2,912,355, 3,905,947, 4,057,529, 4,203,874, European Patent Application Nos. 3820 and 9000, East German Pat. No. 122 255 and Japanese patent application No. 45-114693 published under No. 49-20072.

The compositions described in those documents have at least one of the following drawbacks:

they require the use of organometallic compounds the very complicated formulas of which lead to syntheses which are difficult to carry out, lengthy and expensive;

they have insufficient adherence to metallic surfaces at ambient temperature, after vulcanization;

they have insufficient adherence to metallic surfaces when subjected, after vulcanization, to aging at elevated temperature;

they have an excessive hysteresis loss after vulcanization, this loss leading to a heating of the rubber so that its use is penalized thereby.

The object of the invention is to remedy all these drawbacks at the same time. The inventors have unexpectedly found that all these drawbacks are eliminated when nickel (II) acetylacetonate is added, before vulcanization, to the sulfur-vulcanizable rubber compositions.

Accordingly, the composition in accordance with the invention comprising at least one sulfur-vulcanizable rubber, this composition being intended to adhere to at least one metallic surface during the course of vulcanization, is characterized by the fact that it further comprises from 0.1 to 2 parts by weight of nickel, present in the form of nickel (II) acetylacetonate, per 100 parts by weight of rubber.

The invention also concerns non-vulcanized assemblies comprising at least one composition in accordance with the invention and at least one solid body at least the surface of which is metallic, the composition being intended to adhere to this surface during the course of vulcanization. The invention also concerns a process consisting in preparing an assembly from (a) at least one composition comprising at least one sulfur vulcanizable rubber, this composition being intended to adhere to at least one metallic surface during the course of vulcanization, said composition further comprising from 0.1 to 2 parts by weight of nickel, present in the form of nickel (II) acetylacetonate, per 100 parts by weight of rubber; and from (b) at least one solid body at least the surface of which is metallic, the composition being intended to adhere to this surface during the course of vulcanization; and vulcanizing said assembly.

The invention also concerns the articles obtained by vulcanizing assemblies, each of said assemblies comprising (a) at least one composition comprising at least one sulfur vulcanizable rubber, this composition being intended to adhere to at least one metallic surface during the course of vulcanization, said composition further comprising from 0.1 to 2 parts by weight on nickel, present in the form of nickel (II) acetylacetonate, per 100 parts by weight of rubber; and (b) at least one solid body at least the surface of which is metallic, the composition being intended to adhere to this surface during the course of vulcanization.

These vulcanized articles may, for instance, be belts, tubes and tires. When these articles are tires, said solid bodies may be for instance cables used for the reinforcement of said tires.

The invention will be illustrated by the following non-limitative examples.

EXAMPLE 1

The purpose of this example is to compare the properties after vulcanization of ten compositions containing organic compounds of cobalt or nickel.

The compositions used all have the following basic formulation (in parts by weight):

| | |
|---|---|
| natural rubber | 100 |
| carbon black N 326 | 70 |
| zinc oxide | 9 |
| Santoflex 13 antioxidant | 1 |
| stearic acid | 0.5 |
| sulfur | 7 |
| NOBS | 0.6 |

Santoflex 13: N-dimethyl-1,3 butyl-N'-phenyl p-phenylene-diamine, a product of Monsanto.

NOBS: N-oxydiethylene-2-benzothiazole sulfenamide, which product serves as a vulcanization accelerator.

To this basic formulation there is added an organic compound of cobalt or nickel, the amount of this compound being such as to obtain a composition containing 0.45 part by weight of nickel or cobalt per 100 parts by weight of rubber.

In this way ten different compositions are obtained, identified as C1 to C10, each of these compositions being characterized by the nature of the cobalt or nickel compound as follows:

C1 cobalt naphthenate
C2 nickel naphthenate
C3 cobalt acetate
C4 nickel acetate
C5 cobalt acetylacetonate
C6 nickel acetylacetonate
C7 cobalt p-aminobenzoate
C8 nickel p-aminobenzoate
C9 cobalt salt of ethyl acetyl acetate
C10 nickel salt of ethyl acetyl acetate In all of these compounds the valence of the metal is II.

Composition C6 is, therefore, the only composition in accordance with the invention.

There is furthermore used a composition identified as C0 which corresponds to the basic formulation, without any cobalt or nickel derivative.

Using each of these compositions a test piece is produced in which there is enclosed 1 cm of steel wire covered with zinc or brass, the diameter of this wire together with its outer being 1.3 mm. These test pieces are then vulcanized. The vulcanization is effected in identical manner for all the compositions - held at 140° C. for 60 minutes. In each test piece the wire is thus surrounded axially by a thickness of at least 2 mm of vulcanized composition.

Table 1 below gives for each test piece the force necessary to tear the wire out of the test piece at ambient temperature, that is to say about 20° C. This tearing force is indicated by TZ when the wire is covered with zinc and TB when the wire is covered with brass, this force being expressed in newtons.

The letter D present after certain values of tearing force indicates that the tearing takes place with a partial baring of the initially bonded portion of the wire.

This Table 1 also gives the following values for each composition:

E 100: modulus of elasticity at 100% elongation, this modulus being expressed in mega-pascals (MPa); this modulus is determined by the following formula:

$$E\ 100 = F/S_o \times 1 + \epsilon/\epsilon,$$

F being the force necessary to give a test piece of initial section $S_o$ a relative elongation $\epsilon$ equal to 100%, the ratio $1+\epsilon/\epsilon$ being therefore equal to 2;

P 60: fraction of energy (expressed in %) not restored by a test piece to a pendulum which has deformed it by imparting to it a part of its kinetic energy at a temperature of 60° C.; P 60 is therefore a measure of hysteresis loss at 60° C.

The values E 100 and P 60 are determined on test pieces without metallic wire, the compositions being then vulcanized under the same conditions as the test pieces with metallic wires.

TABLE 1

| Composition | E 100 (MPa) | P 60 (%) | TZ (N) | TB (N) |
|---|---|---|---|---|
| C0 | 9 | 24 | 50 D | 800 D |
| C1 | 10 | 30 | 1200 | 1100 |
| C2 | 12 | 25 | 230 D | 300 D |
| C3 | 12 | 31 | 1000 | 1000 |
| C4 | 11 | 26 | 350 D | 500 D |
| C5 | 10 | 30 | 1200 | 1200 |
| C6 | 10 | 24 | 1100 | 1300 |
| C7 | 13 | 29 | 1100 | 1100 |
| C8 | 12 | 24 | 500 D | 900 |
| C9 | 9.5 | 34 | 1200 | 1100 |
| C10 | 9 | 27 | 400 D | 1100 |

The values in this Table 1 show that:

(1) The composition C0, without an organometallic compound, leads to tearing forces TZ, TB which are the smallest or among the smallest.

(2) The E 100 moduli are all of the same order.

(3) All the cobalt compounds lead to compositions whose tearing forces TZ or TB are close to each other, since these forces are between 1000 and 1200 newtons.

(4) Among the nickel compounds, only nickel (II) acetylacetonate (composition C6 of the invention) makes it possible to obtain high tearing forces, these forces being then of the same order of magnitude as those obtained with the cobalt compounds or even higher in the case of brass-covered wires. All the other compounds of nickel lead to tearing forces which are generally far less than those obtained with the corresponding organic compounds of cobalt, particularly upon bonding onto zinc-covered wires (TZ). This fact is surprising since nickel and cobalt occupy adjacent places in the periodic table of elements. One could, in fact, expect that the organic compounds of cobalt or nickel, having the same organic radical, would lead to comparable bondings.

(5) Among the compositions C1 to C10 each of which contains an organometallic compound, composition C6 of the invention limits the hysteresis loss to the lowest level, substantially the same as for composition C0 which is without an organometallic compound. By way of example, comparision of the results obtained with compositions C5, C6 containing the same organic radical (acetylacetonate) shows that the replacement of the cobalt by nickel makes it possible to decrease the hysteresis loss by 20% for identical moduli, this therefore corresponding to a very substantial improvement. This fact is unexpected in view of the adjacent position of cobalt and nickel in the periodic table of elements. It is important to decrease the hysteresis losses, since they lead to a heating of the rubber upon the working of the corresponding articles, which heating may cause a rapid deterioration of the articles. This phenomenon is evident in particular in automobile tires and more particularly in tires for heavy vehicles or for earth-moving equipment which are subject to extensive heating as a result of the successive deformations of the vulcanized product upon their use. The use of nickel (II) acetylacetonate in accordance with the invention therefore makes it possible substantially to increase the life of these articles.

EXAMPLE 2

This example is intended to show the action of acetylacetonates of metals other than cobalt and nickel. To the basic formulation given in Example 1 a metallic acetylacetonate is added in such amount that the composition obtained contains 0.45 part by weight of metal per 100 parts by weight of rubber. In this way four compositions are obtained, identified as C11 to 14, each of them being characterized as follows by the nature of the acetylacetonate:

C11 copper (II) acetylacetonate
C12 iron (II) acetylacetonate
C13 vanadium (IV) acetylacetonate
C14 manganese (II) acetylacetonate Table 2 below gives the properties obtained after vulcanization in the case of these compositions. The symbols E 100, P 60, TZ and TB have the same meaning as in Example 1.

TABLE 2

| Composition | E 100 (MPa) | P 60 (%) | TZ (N) | TB (N) |
|---|---|---|---|---|
| C11 | 12 | 25 | 100 D | 450 D |
| C12 | 11 | 27 | 150 D | 400 D |
| C13 | 8 | 28 | 50 D | 350 D |
| C14 | 10 | 25 | 50 D | 400 D |

This table 2 shows that the acetylacetonates of copper, iron, vanadium and manganese give tearing forces which are entirely inadequate, with baring of the wire in each test.

The fact that the use of nickel (II) acetylacetonate makes it possible to have both a good bonding and a low hysteresis loss is therefore surprising, particularly so as iron and copper are close to nickel in the periodic table of elements.

EXAMPLE 3

This example is intended to study the action of nickel (II) acetylacetonate on various rubber mixes. The basic formulation given in Example 1 is modified in each case by replacing the 100 parts of natural rubber with a mix containing 50 parts of natural rubber and 50 parts of a synthetic rubber. The same amount of nickel (II) acetylacetonate is then added to the different formulations thus obtained, so as to obtain three compositions identified as C 61 to C 63, each of which contains 0.45 part of nickel, all these parts being by weight. The three compositions therefore differ by the nature of the synthetic rubber which they contain as follows:

C 61 contains styrene-butadiene rubber
C 62 contains polybutadiene rubber
C 63 contains polyisoprene rubber.

Table 3 below sets forth the properties obtained after vulcanization for these compositions. The symbols E 100, P 60, TZ, TB have the same meanings as in Examples 1 and 2.

TABLE 3

| Composition | E 100 (MPa) | P 60 (%) | TZ (N) | TB (N) |
|---|---|---|---|---|
| C61 | 11 | 29 | 1100 | 1250 |
| C62 | 9.5 | 22 | 850 | 1100 |
| C63 | 10 | 28 | 800 | 1000 |

This Table 3 shows that the tearing forces are satisfactory and that there is no baring of the wire.

If one measures the values TZ, TB and P 60 at ambient temperature on test pieces which are subjected after vulcanization to aging for 48 hours at 100° C., the test pieces being made with compositions containing, on the one hand, natural rubber or one of the sulfur-vulcanizable rubber mixes described previously and, on the other hand, either one of the cobalt compounds described in Example 1 or nickel (II) acetylacetonate, the proportions being the same as those indicated in Examples 1 and 3, the following is noted:

The values of the tearing forces TZ, TB for each of the test pieces are of the same order of magnitude as the forces measured before aging.

The test pieces obtained with compositions containing nickel (II) acetylacetonate have hysteresis losses which are lower by about 20% than the losses measured on the test pieces which have the same composition but which contain a cobalt compound, all these measurements being effected at ambient temperature after aging. The beneficial effect of the nickel (II) acetylacetonate on the hysteresis losses, which has been described in Example 1 in the case of non-aged test pieces, is therefore retained after aging.

The compositions of the invention may contain fillers, vulcanization accelerators or various adjuvants, the basic formulation given in Example 1 being in no way limitative.

In the compositions of the invention, the amount of nickel present in the form of nickel (II) acetylacetonate varies from 0.1 to 2 parts by weight of nickel per 100 parts by weight of rubber, since, for amounts less than 0.1 part by weight per 100 parts by weight of rubber, the tearing forces are insufficient and for amounts greater than 2 parts by weight per 100 parts by weight of rubber the tearing forces are no greater than those which are obtained with smaller amounts of nickel, this surplus of nickel in the form of nickel (II) acetylacetonate being furthermore unfavorable for economic reasons. The amount of nickel present in the form of nickel (II) acetylacetonate advantageously varies from 0.2 to 1 part by weight of nickel per 100 parts by weight of rubber.

When the compositions of the invention contain zinc oxide, the amount of zinc oxide varies preferably from 3 to 80 parts by weight per 100 parts by weight of rubber and advantageously from 5 to 15 parts by weight per 100 parts by weight of rubber.

The amount of sulfur varies preferably from 1 to 10 parts by weight per 100 parts by weight of rubber and advantageously from 3 to 7 parts by weight per 100 parts by weight of rubber.

When stearic acid is used in the compositions of the invention, the amount of stearic acid varies preferably from 0.1 to 3 parts by weight per 100 parts by weight of rubber and advantageously from 0.2 to 1 part by weight per 100 parts by weight of rubber.

It goes without saying that in the examples described the metallic wires may be formed entirely of brass or zinc. The beneficial effect of the compositions of the invention can be noted on metallic surfaces other than brass and zinc, for instance on copper and on steel.

Furthermore, the metallic surfaces to which the compositions of the invention are capable of adhering may possibly be applied to non-metallic materials, for instance inorganic materials, in particular glass, or organic polymers, in particular plastics.

Of course, the invention is not limited to the embodiments described, on basis of which one can contemplate other embodiments without thereby going beyond the scope of the invention.

What is claimed is:

1. An assembly comprising at least one rubber composition and at least one solid body at least the surface of which is zinc or brass, the rubber composition being in contact with the solid body wherein the rubber composition is characterized by the following features and properties:
  (a) it comprises a basic formulation containing at least one sulfur-vulcanizable rubber and from 1 to 10 parts by weight of sulfur, per 100 parts by weight of rubber;
  (b) it further comprises from 0.1 to 2 parts by weight of nickel, present in the form of nickel (II) acetylacetonate, per 100 parts by weight of rubber;
  (c) the rubber composition and the basic formulation have substantially the same hysteresis loss when vulcanized under the same conditions.

2. An assembly according to claim 1, characterized by the fact that the amount of nickel is from 0.2 to 1 part by weight of nickel, present in the form of nickel (II) acetylacetonate, per 100 parts by weight of rubber.

3. An assembly according to claim 1, characterized by the fact that the rubber composition further comprises from 3 to 80 parts by weight of zinc oxide per 100 parts by weight of rubber.

4. An assembly according to claim 3, characterized by the fact that the amount of zinc oxide is from 5 to 15 parts by weight of zinc oxide per 100 parts by weight of rubber.

5. An assembly according to claim 1, characterized by the fact that the amount of sulfur is from 3 to 7 parts by weight of sulfur per 100 parts by weight of rubber.

6. An assembly according to claim 1, characterized by the fact that the rubber composition further comprises from 0.1 to 3 parts by weight of stearic acid per 100 parts by weight of rubber.

7. An assembly according to claim 6, characterized by the fact that the amount of stearic acid is from 0.2 to 1 part by weight of stearic acid per 100 parts by weight of rubber.

8. An assembly according to claim 1, characterized by the fact that the rubber composition contains at least one diene rubber.

9. An assembly according to claim 8, characterized by the fact that the diene rubber is selected from the group consisting of natural rubber, styrene-butadiene rubber, polybutadiene rubber and polyisoprene rubber.

10. An article obtained by vulcanizing the assembly according to claim 1.

11. Article according to claim 1 characterized by the fact that it is a tire.

12. Tire according to claim 11 characterized by the fact that it is designed for heavy vehicles or for earth-moving equipment.

* * * * *